US008285708B2

(12) United States Patent
Bowers et al.

(10) Patent No.: US 8,285,708 B2
(45) Date of Patent: Oct. 9, 2012

(54) QUERY SUBMISSION PIPELINE USING LINQ

(75) Inventors: Stuart M. Bowers, Redmond, WA (US); David Brian Wecker, Redmond, WA (US); Chris D. Karkanias, Sammamish, WA (US); Burton Jordan Smith, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 322 days.

(21) Appl. No.: 12/485,054

(22) Filed: Jun. 16, 2009

(65) Prior Publication Data

US 2010/0114885 A1    May 6, 2010

Related U.S. Application Data

(60) Provisional application No. 61/107,069, filed on Oct. 21, 2008.

(51) Int. Cl.
*G06F 7/00* (2006.01)
*G06F 17/30* (2006.01)

(52) U.S. Cl. .......................... 707/713; 707/755; 707/769

(58) Field of Classification Search ........................ None
See application file for complete search history.

(56) References Cited

U.S. PATENT DOCUMENTS

| 6,081,801 A * | 6/2000 | Cochrane et al. ...................... 1/1 |
| 7,805,435 B2 * | 9/2010 | Dettinger et al. ............. 707/713 |
| 8,037,008 B2 * | 10/2011 | Jung et al. ........................ 706/59 |
| 2003/0120682 A1 * | 6/2003 | Bestgen et al. ............ 707/104.1 |
| 2004/0006561 A1 * | 1/2004 | Nica ................................. 707/3 |
| 2004/0152984 A1 * | 8/2004 | Crutchfield et al. .......... 600/454 |
| 2005/0289125 A1 * | 12/2005 | Liu et al. ............................ 707/3 |
| 2006/0036592 A1 * | 2/2006 | Das et al. .......................... 707/4 |
| 2006/0190438 A1 * | 8/2006 | Brei .................................... 707/3 |
| 2006/0195425 A1 * | 8/2006 | Deem et al. ....................... 707/3 |
| 2007/0027905 A1 * | 2/2007 | Warren et al. ............. 707/103 R |
| 2007/0226196 A1 * | 9/2007 | Adya et al. ........................ 707/3 |
| 2007/0226203 A1 * | 9/2007 | Adya et al. ........................ 707/4 |
| 2007/0244865 A1 * | 10/2007 | Gordon et al. .................... 707/3 |
| 2008/0065590 A1 * | 3/2008 | Castro et al. ...................... 707/2 |
| 2008/0116449 A1 * | 5/2008 | Macready et al. .............. 257/31 |
| 2008/0228697 A1 * | 9/2008 | Adya et al. ........................ 707/2 |
| 2008/0256026 A1 * | 10/2008 | Hays ................................. 707/2 |

(Continued)

OTHER PUBLICATIONS

Torgersen M., Language Integrated Query: Unified Querying Across Data Sources and Programming Languages, Oct. 2006, ACM, pp. 736-737.*

*Primary Examiner* — Robert Timblin
*Assistant Examiner* — Jessica N Le
(74) *Attorney, Agent, or Firm* — Gonzalez Saggio & Harlan LLP

(57) ABSTRACT

Described is a technology comprising a query processing pipeline in which a SPARQL query is processed into an intermediate LINQ query, which is then processed by a LINQ provider. The LINQ provider decides which instructions correspond to flat database queries, and routes those instructions a database engine (e.g., SQL server) for querying a database. Other instructions are provided to a reasoning engine for processing, e.g., by performing a graph traversal and/or database queries. The pipeline may include a parser that parses the query into an abstract syntax tree, and an optimizer that processes the abstract syntax tree into a LINQ query, including by reordering LINQ instructions and/or associating a flag with each of the instructions that indicates whether to query the database or provide the instruction to a reasoning engine.

17 Claims, 3 Drawing Sheets

U.S. PATENT DOCUMENTS

2009/0144229 A1* 6/2009 Meijer et al. ............... 707/2
2009/0157606 A1* 6/2009 Dettinger et al. ........... 707/3
2009/0222404 A1* 9/2009 Dolin et al. ................ 707/2
2010/0005077 A1* 1/2010 Krishnamurthy et al. ..... 707/4
2010/0082656 A1* 4/2010 Jing et al. .................. 707/760

* cited by examiner

QUERY SUBMISSION PIPELINE USING LINQ

CROSS-REFERENCE TO RELATED APPLICATION

The present application claims priority to U.S. provisional patent application Ser. No. 61/107,069, filed Oct. 21, 2008, hereby incorporated by reference.

BACKGROUND

Researchers have different abilities and knowledge with respect to finding data. There are many query languages, programming languages, tools and other mechanisms that researchers can use to find relevant data.

One such query language is SPARQL, which is standardized and thus used directly to compose queries, or by many tools that help users compose queries. However, a significant amount of data including medical/clinical data is maintained in a format that many querying languages including SPARQL are unable to access.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a query (e.g., a SPARQL query) or query-related data is processed through a pipeline that includes a LINQ provider. The LINQ provider processes LINQ instructions that correspond to the query. The processing includes determining which instructions correspond to flat database queries; those instructions are provided to a database engine (e.g., SQL) for querying a database. Data corresponding to other instructions are provided to a reasoning engine for processing, e.g., by performing a graph traversal and/or database queries.

In one implementation, the pipeline includes a parser that parses the query into an abstract syntax tree. An optimizer processes the abstract syntax tree into a LINQ query for processing by the LINQ provider. The optimizer may reorder instructions in the LINQ query, and/or may associate a flag with each of the instructions with a value that indicates whether to query the database with a flat query, or provide the instruction to a reasoning engine.

The pipeline may includes means for pivoting a query from being node-centric to being edge-centric, and means for reverting the pivoting of at least one predicate from being edge-centric to being node-centric.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a query submission pipeline that allows SPARQL and other such queries to be submitted against data that cannot be directly queried by the querying language. In one implementation, this is accomplished by optimizing an abstract syntax tree representative of the query into LINQ (Language Integrated Query, a Microsoft .NET component that provides for data querying with .NET languages) instructions, and then converting the LINQ instructions into one or more SQL queries.

While the examples herein are described in the context of researchers, it is understood these are only examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
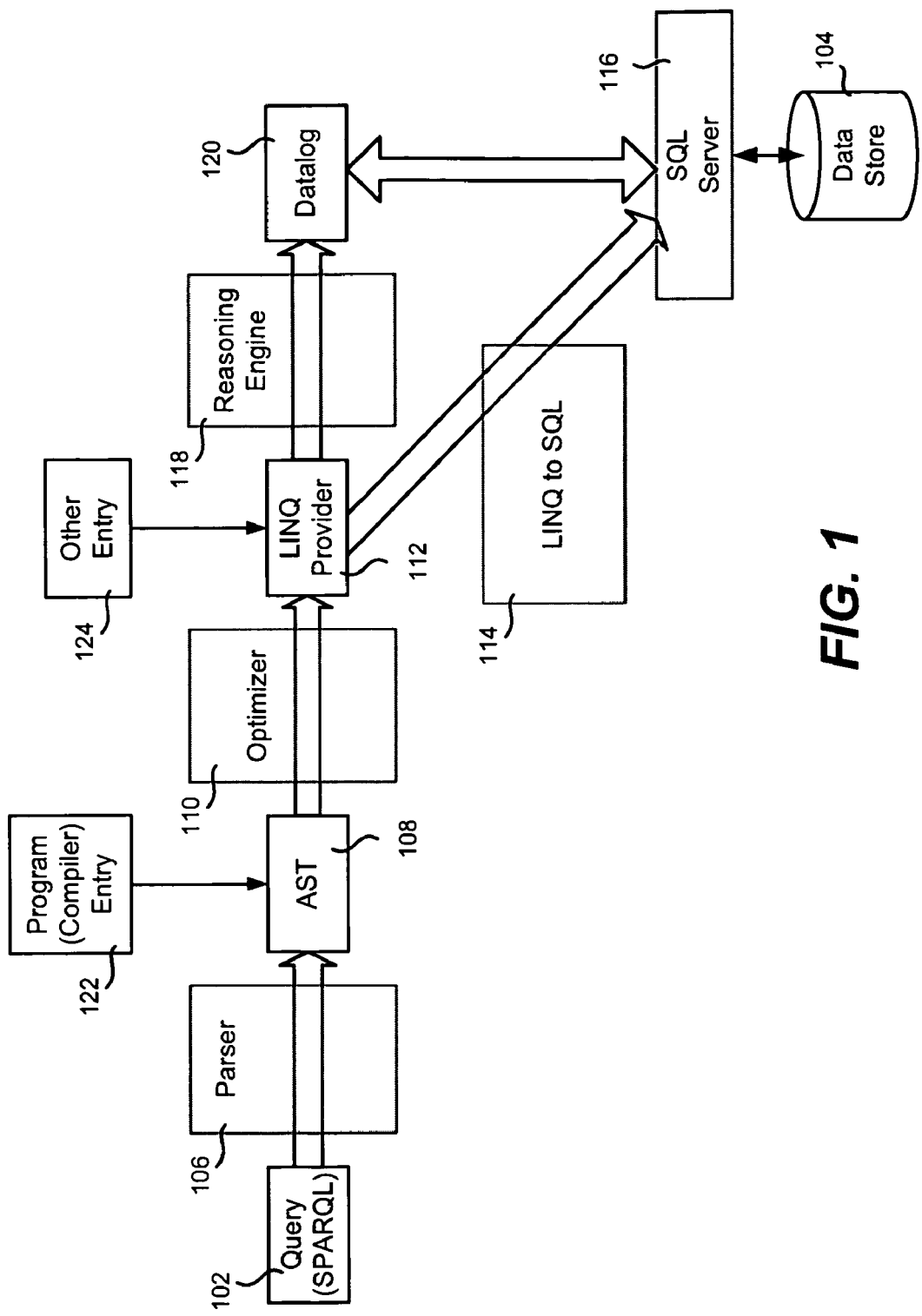
FIG. 1 is a block diagram showing an example pipeline for accessing data that uses LINQ (Language Integrated Query) as an intermediate format.

As generally represented in the example of FIG. 1, every time a user queries the system, the query 102 goes through a data transformation pipeline before it is sent to a data store 104 (which may comprise one or more databases). In one implementation, this pipeline includes a parser 106 that converts the query to an abstract syntax tree (AST) 108, and a query optimizer 110 that optimizes the abstract syntax tree 108 into LINQ instructions consumed by a LINQ provider 112.

In one implementation, the SPARQL parser 106 and query optimizer 110 consume SPARQL queries, parse them and pivot the queries from being node-centric to being edge-centric (i.e., looking at the relationships in the knowledge graph). As shown by the LINQ to SQL block 114, this allows the queries to be directly run against a SQL triples store without any need for a reasoning engine, when desired. A query run this way requires only a single call to the server 116 to execute, and makes full utilization of the SQL query optimizer and SQL's in-memory joins. One drawback is that this technique needs to be applied to a fully forward chained knowledge store or one that utilizes no inferable predicates; (note that the current LINQ queries that are constructed are nearly identical to those consumed by SQL's LINQ provider, but SQL may be unable to consume them).

As described below, the LINQ query may be converted to SQL (block 114) for providing to a SQL server engine (block 116) that accesses the data store 104 (when that store is one that does not require inference). Alternatively, the LINQ query 112 may be provided to a reasoning engine (block 118), e.g., based upon a known datalog inference engine (block 120) path to the SQL server 116. In this manner, these components enable query optimizations in SQL and allow for a very lightweight deployment against triples stores that do not require inference. Note that while one reasoning engine/inference engine are shown, it is understood that other engines or the like may be part of the pipeline. For example, the reasoning engine may be a SAT solver, a Bayesian inference engine, and so forth.

Figure 2:
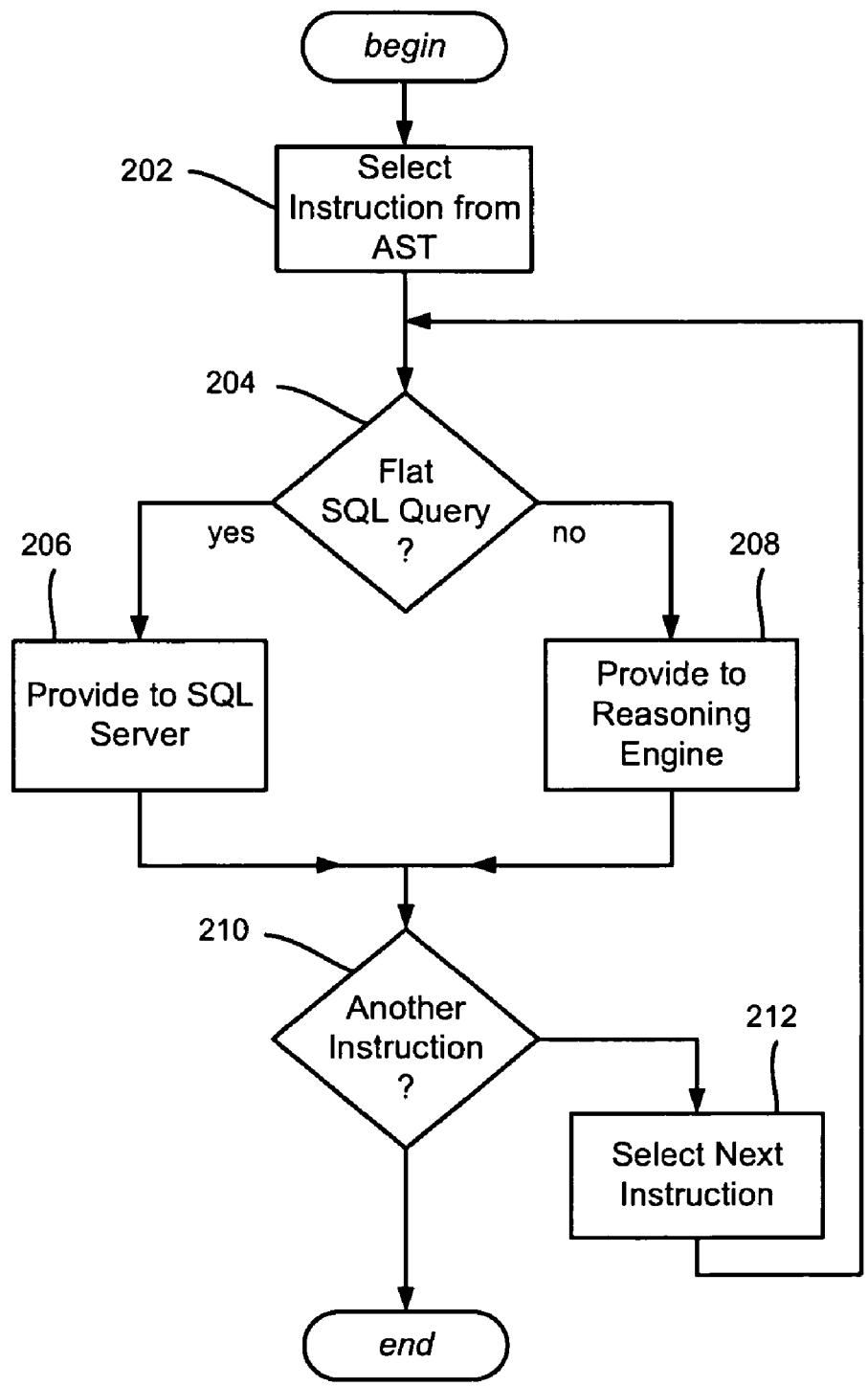
FIG. 2 is a flow diagram representing logic performed by a LINQ provider to process LINQ instructions.

FIG. 2 shows example steps of the LINQ provider with respect to processing the optimized instructions from the abstract syntax tree 108. An instruction is selected from the abstract syntax tree (AST) (step 202). If the instruction corresponds to a flat SQL query (step 204), a query is sent to the SQL server (step 206) to obtain the results. Otherwise the instruction is provided to the reasoning engine (step 208). Step 210 repeats the process for other instructions and a next instruction is selected (step 212). Note that as described below, the results may be combined, used for further querying and so forth. As also described below, multiple instructions may be combined into one SQL query.

By way of example of the alternate paths, consider a query directed toward finding patients less than eighteen years of age having a particular disease. Finding the set of patients less than eighteen is an atomic fact that can be accomplished by a simple SQL query (assuming age is maintained for each patient). However, whether someone has a disease may be based on a number of criteria, such as having various symptoms, a certain genetic make-up/history, prior conditions, and so forth. Further, there may be differences in how the data is maintained; for example, the data may indicate that Type 1 diabetes is a diabetes, Type 2 diabetes is a diabetes, and that diabetes is a disease. However, there is no direct data that specifies that Type 1 diabetes is a disease or that Type 2 diabetes is a disease, so this is not determinable from a simple query. To make such a conclusion, these two concepts need to be linked together. This is possible in SQL; however this is often highly join intensive and thus very inefficient.

These criteria and relationships correspond to a relationship graph, which the reasoning engine 118 is provided to efficiently traverse to reach these types of conclusions. Thus, simple facts may be determined from the database, whereas a reasoning engine may be needed to obtain and analyze a graph of data to make a determination as to another part of the abstract syntax tree. The LINQ provider 112 divides the instructions in the (optimized) abstract syntax tree 108 for processing by the LINQ to SQL component 114 or the reasoning engine 118.

To this end, predicate logic-like chains may be programmatically constructed or pre-built, e.g., subject IS_A object (where IS_A corresponds to a filtering criterion). For example, X, Y and Z may be used to represent Type 1 diabetes, disease, and Type 2 diabetes, or more generically, X IS_A Y, such as set forth as:

```
IS_A (X, Y, 1) :- IS_A (X, Z, 0), IS a (Z, Y, 1)
IS_A (X, Y, 2) :- IS_A (Z, Y, 0), IS a (X, Z, 2).
```

These chains in turn may be optimized such as by reordering to narrow the results before those results are processed by the next part. Further, as shown above, the chains may contain a flag (0, 1 or 2) that indicates whether the reasoning engine is to go the database table to get some results (0), or whether the reasoning engine needs to focus on the subject (1) or object (2). The database results are then combined with the flat data to obtain the desired results.

Various query optimization techniques for databases may apply, however in this technology the techniques are directed towards reasoning. For example, arguments may be type safe, cardinality may be used as a hint, and so forth. However, the optimizer is not the same as SQL (e.g., SQL) avoids joins, whereas the optimizer 110 may first use joins to narrow the data space.

By way of a more particular example, consider a query to find patients that meet a set of criteria, e.g., identify patients less than age eighteen. This may be canonicalized to a reasoning query:

```
?X IS_A ?PATIENT
?X HAS_NAME ?NAME
?X AGE ?AGE
    WHERE ?AGE < 18
    PATIENT=" PATIENT"
```

This may be compiled into:

```
X IS_A (X, P),
HAS_NAME (X, N),
AGE (X, A)
A < 18
P =" PATIENT"
```

However, if processed in the above order, the patients are returned, then all names for all the patients returned, then the names filtered by the ages. This is inefficient, especially if the database is remote. Instead, reordering by the optimizer 110 (e.g., based upon cardinalities) improves efficiency and the amount of data returned:

```
P =" PATIENT"
IS_A (X, P, 2),
AGE (X, A, 1)
A < 18
HAS_NAME (X, N, 1).
```

In this way, only patients are found, and those less than eighteen need to have their names retrieved. Note that "AGE (X, A, 1)" and "A<18" lines correspond to a flat SQL query. It is also feasible (e.g., based upon cardinalities) to first get all people less than eighteen, then find out which are patients, e.g., if the database contains mostly patients. Further note that whether a person is a patient may require reasoning, e.g., people may not be directly identified as patients, but may be identified as outpatients, hospital patients, and so forth.

The query that is ultimately sent to the database may be combined, e.g., the IS_A may be joined. Further, the database does its own optimization, making this even more efficient. Note that the optimizer may also request more data so as to make fewer query trips to the database.

Another aspect is directed towards predicate inferencing. By providing a variable to SQL instead of a string, the predicate may be returned. For example, consider providing variable, patient, disease to SQL; SQL will return the relationship between each patient and each disease, e.g., whether the relationship is an "IS_A", a "HAS_A" and so forth.

Returning to FIG. 1, as another benefit of the pipeline architecture, other levels of entry may be used. More particularly, in the example of FIG. 1, a program entry level (block 122) allows for providing the abstract syntax tree 108 without parsing the query, e.g., via a compiler for a programming language. An "Other" entry level (block 124) allows for directly inserting the LINQ query 112 into the pipeline.

To add backward chaining as an inference technique, these LINQ queries may be consumed via the LINQ provider, utilizing a closed world assumption to selectively revert the pivoting of certain predicates back into a node-centric paradigm. LINQ is used as an intermediate format allowing for a flexible deployment of the query pipeline, providing a natural extension point for different reasoning techniques. The pieces of the flattened SQL query are registered with an instance of the Datalog (inference engine) 120 using a Clause Provider, and the inferable predicates are expressed in the Datalog object model and inferred over.

Exemplary Operating Environment

Figure 3:
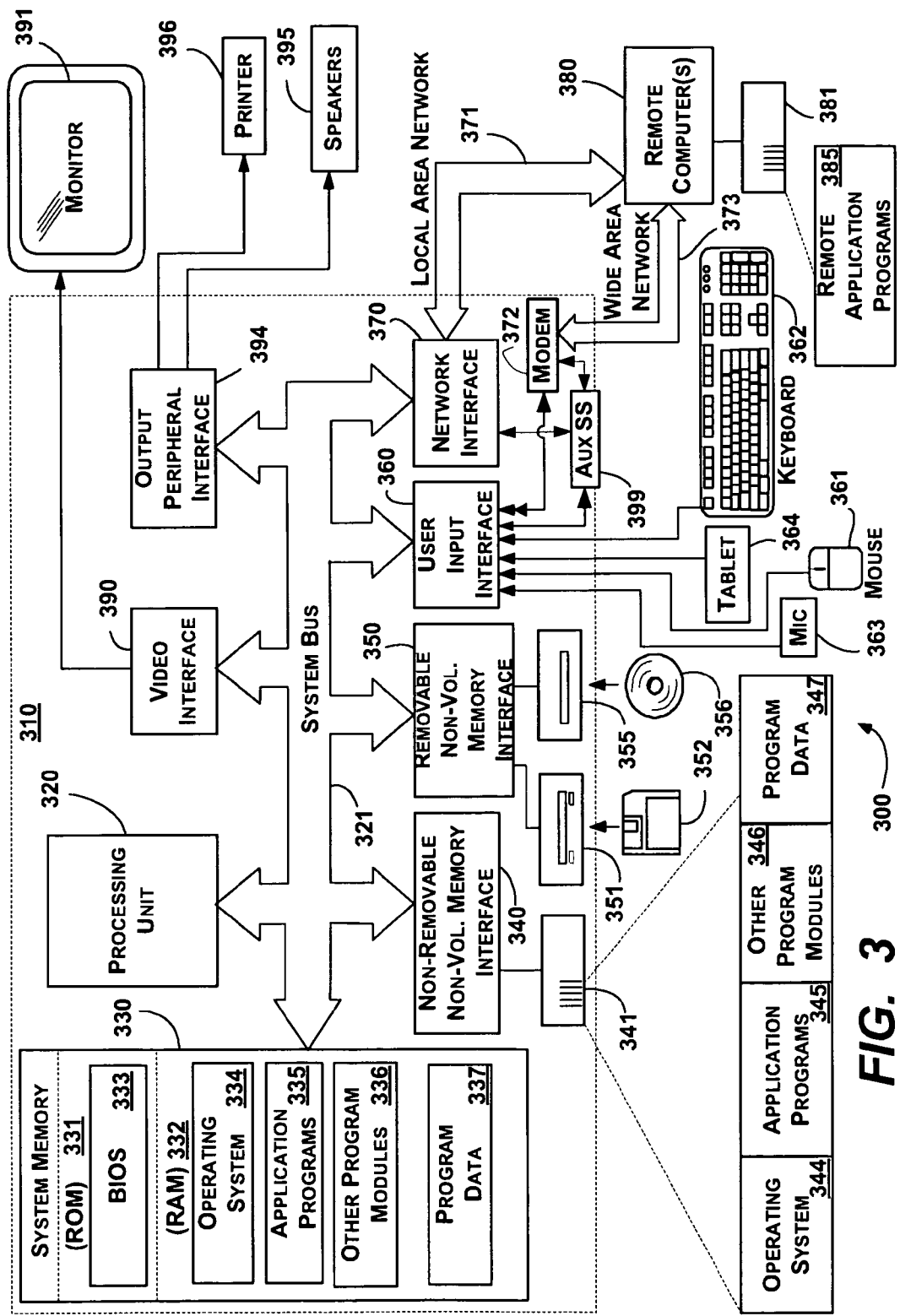
FIG. 3 shows an illustrative example of a computing environment into which various aspects of the present invention may be incorporated.

FIG. 3 illustrates an example of a suitable computing and networking environment 300 on which the examples of FIGS. 1-2 may be implemented. The computing system environment 300 is only one example of a suitable computing environment and is not intended to suggest any limitation as to the scope of use or functionality of the invention. Neither should the computing environment 300 be interpreted as having any dependency or requirement relating to any one or combination of components illustrated in the exemplary operating environment 300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 3, an exemplary system for implementing various aspects of the invention may include a general purpose computing device in the form of a computer 310. Components of the computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 310 typically includes a variety of computer-readable media. Computer-readable media can be any available media that can be accessed by the computer 310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 330 includes computer storage media in the form of volatile and/or nonvolatile memory such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336 and program data 337.

The computer 310 may also include other removable/non-removable, volatile/nonvolatile computer storage media. By way of example only, FIG. 3 illustrates a hard disk drive 341 that reads from or writes to non-removable, nonvolatile magnetic media, a magnetic disk drive 351 that reads from or writes to a removable, nonvolatile magnetic disk 352, and an optical disk drive 355 that reads from or writes to a removable, nonvolatile optical disk 356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface such as interface 340, and magnetic disk drive 351 and optical disk drive 355 are typically connected to the system bus 321 by a removable memory interface, such as interface 350.

The drives and their associated computer storage media, described above and illustrated in FIG. 3, provide storage of computer-readable instructions, data structures, program modules and other data for the computer 310. In FIG. 3, for example, hard disk drive 341 is illustrated as storing operating system 344, application programs 345, other program modules 346 and program data 347. Note that these components can either be the same as or different from operating system 334, application programs 335, other program modules 336, and program data 337. Operating system 344, application programs 345, other program modules 346, and program data 347 are given different numbers herein to illustrate that, at a minimum, they are different copies. A user may enter commands and information into the computer 310 through input devices such as a tablet, or electronic digitizer, 364, a microphone 363, a keyboard 362 and pointing device 361, commonly referred to as mouse, trackball or touch pad. Other input devices not shown in FIG. 3 may include a joystick, game pad, satellite dish, scanner, or the like. These and other input devices are often connected to the processing unit 320 through a user input interface 360 that is coupled to the system bus, but may be connected by other interface and bus structures, such as a parallel port, game port or a universal serial bus (USB). A monitor 391 or other type of display device is also connected to the system bus 321 via an interface, such as a video interface 390. The monitor 391 may also be integrated with a touch-screen panel or the like. Note that the monitor and/or touch screen panel can be physically coupled to a housing in which the computing device 310 is incorporated, such as in a tablet-type personal computer. In addition, computers such as the computing device 310 may also include other peripheral output devices such as speakers 395 and printer 396, which may be connected through an output peripheral interface 394 or the like.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 3. The logical connections depicted in FIG. 3 include one or more local area networks (LAN) 371 and one or more wide area networks (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360 or other appropriate mechanism. A wireless networking component such as comprising an interface and antenna may be coupled through a suitable device such as an access point or peer computer to a WAN or LAN. In a networked environment, program modules depicted relative to the computer 310, or portions thereof, may be stored in the remote memory storage device. By way of example, and not limitation, FIG. 3 illustrates remote application programs 385 as residing on memory device 381. It may be appreciated that the network connections shown are exemplary and other means of establishing a communications link between the computers may be used.

An auxiliary subsystem 399 (e.g., for auxiliary display of content) may be connected via the user interface 360 to allow data such as program content, system status and event notifications to be provided to the user, even if the main portions of the computer system are in a low power state. The auxiliary subsystem 399 may be connected to the modem 372 and/or network interface 370 to allow communication between these systems while the main processing unit 320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a system comprising:
one or more processors; and
a query processing pipeline implemented on the one or more processors, including:
a parser,
an optimizer,
a Language Integrated Query (LINQ) provider, and
means for pivoting one or more queries from being node-centric to being edge-centric, wherein the parser parses a query of a first query language into an abstract syntax tree, wherein the query of the first query language comprises a SPARQL Protocol and Resource descriptive framework Query Language (SPARQL) query, wherein the optimizer processes the abstract syntax tree into LINQ instructions, and wherein the LINQ provider processes the LINQ instructions, in which for an instruction that corresponds to a flat query, the LINQ provider provides a query of a second query language to a database engine for querying a database, and for other instructions that do not correspond to the flat query, provides data corresponding to the other instructions to a reasoning engine for processing.

2. The system of claim 1, wherein the query of the second query language comprises a Structured Query Language (SQL) query.

3. The system of claim 1, wherein the optimizer associates a flag with the LINQ instructions, and wherein the flag indicates whether the reasoning engine is to focus on cardinalities.

4. The system of claim 1, wherein the abstract syntax tree is provided by a program compiler.

5. The system of claim 1, wherein the optimizer reorders the LINQ instructions.

6. The system of claim 1, wherein the optimizer associates a flag with the LINQ instructions, the flag including a value that indicates whether to query the database with the flat query for an instruction.

7. The system of claim 1, further comprising means for reverting the pivoting of at least one predicate from being the edge-centric to being the node-centric.

8. In a computing environment, a method comprising:
transforming, by one or more processors, a SPARQL Protocol and Resource descriptive framework Query Language (SPARQL) query as a first query language into a Language Integrated Query (LINQ) query, wherein the transforming of the (SPARQL) query into the LINQ query comprises parsing the (SPARQL) query into an abstract syntax tree and optimizing the abstract syntax tree into LINQ instructions;
processing the LINQ query into at least one query in a second query language and one or more instructions provided to a reasoning engine, the reasoning engine determining from the one or more instructions whether results are found via graph traversal or via the at least one query provided in the second query language; and
pivoting the SPARQL query from being node-centric to being edge-centric.

9. The method of claim 8, further comprising: reverting the pivoting of at least one predicate from being the edge-centric to being the node-centric.

10. The method of claim 8, wherein the optimizing of the abstract syntax tree into the LINQ instructions from the abstract syntax tree further comprises reordering the LINQ instructions.

11. The method of claim 8, further comprising associating data with each LINQ instruction in the LINQ instructions that indicates whether to process the each LINQ instruction via a flat database query or by the graph traversal.

12. The method of claim 8, wherein the at least one query in the second query language comprises Structured Query Language (SQL).

13. In a computing environment, a system comprising:
one or more processors; and
a query processing pipeline implemented on the one or more processors including:
    a parser that parses a SPARQL Protocol and Resource descriptive framework Query Language (SPARQL) query into an abstract syntax tree,
    an optimizer that processes the abstract syntax tree into Language Integrated Query (LINQ) instructions, and
    a LINQ provider that processes the LINQ instructions into at least one flat query for providing to a database engine in a second query language, or into instructions for providing to a reasoning engine, or both into at least one flat query for providing to the database engine in the second query language and into the instructions for providing to the reasoning engine, wherein the optimizer further performs at least one of reordering instructions in the LINQ instructions or associating a flag with at least some of the LINQ instructions, and wherein the query processing pipeline includes means for pivoting a query from being node-centric to being edge-centric.

14. The system of claim 13, wherein the second query language comprises Structured Query Language (SQL).

15. The system of claim 13, wherein the flag associated with at least some of the LINQ instructions indicates whether the reasoning engine is to focus on cardinalities.

16. The system of claim 13, wherein the flag associated with at least some of the LINQ instructions indicates whether to query the database with the flat query for an instruction.

17. The system of claim 13, wherein the query processing pipeline includes means for reverting the pivoting of at least one predicate from being the edge-centric to being the node-centric.

* * * * *